US006785602B2

(12) United States Patent
Gröne et al.

(10) Patent No.: US 6,785,602 B2
(45) Date of Patent: *Aug. 31, 2004

(54) METHOD FOR MAGNIFYING TORQUE DURING THE OPERATION OF A MOTOR VEHICLE

(75) Inventors: Michael Gröne, Bad Ditzenbach (DE); Hartmut Weckenmann, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 171 days.

This patent is subject to a terminal disclaimer.

(21) Appl. No.: 10/013,138

(22) Filed: Dec. 7, 2001

(65) Prior Publication Data

US 2002/0103594 A1 Aug. 1, 2002

(30) Foreign Application Priority Data

Dec. 9, 2000 (DE) .......................................... 100 61 432

(51) Int. Cl.[7] .......................... B60K 41/02; F02D 17/02

(52) U.S. Cl. ........................ 701/110; 123/350; 477/181

(58) Field of Search ................................ 701/110, 114, 701/101; 477/73, 181; 123/350

(56) References Cited

U.S. PATENT DOCUMENTS

| | | | | |
|---|---|---|---|---|
| 6,098,592 A | * | 8/2000 | Hess et al. | 123/350 |
| 6,119,654 A | * | 9/2000 | Heiselbetz et al. | 123/350 |
| 6,582,341 B2 | * | 6/2003 | Groene et al. | 477/181 |

* cited by examiner

*Primary Examiner*—Hieu T. Vo

(74) *Attorney, Agent, or Firm*—Kenyon & Kenyon

(57) ABSTRACT

In a method for setting torque in the operation of a motor vehicle, especially in the case of a small engine torque change in the lower to medium load range, the driver-selected torque is magnified dynamically in time, and the enhancement component is then correspondingly reduced down to an enhancement component of zero as the actual value of the torque approaches the driver-selected torque. An increase in responsiveness and a better response behavior are achieved in response to small accelerator pedal movements.

11 Claims, 1 Drawing Sheet

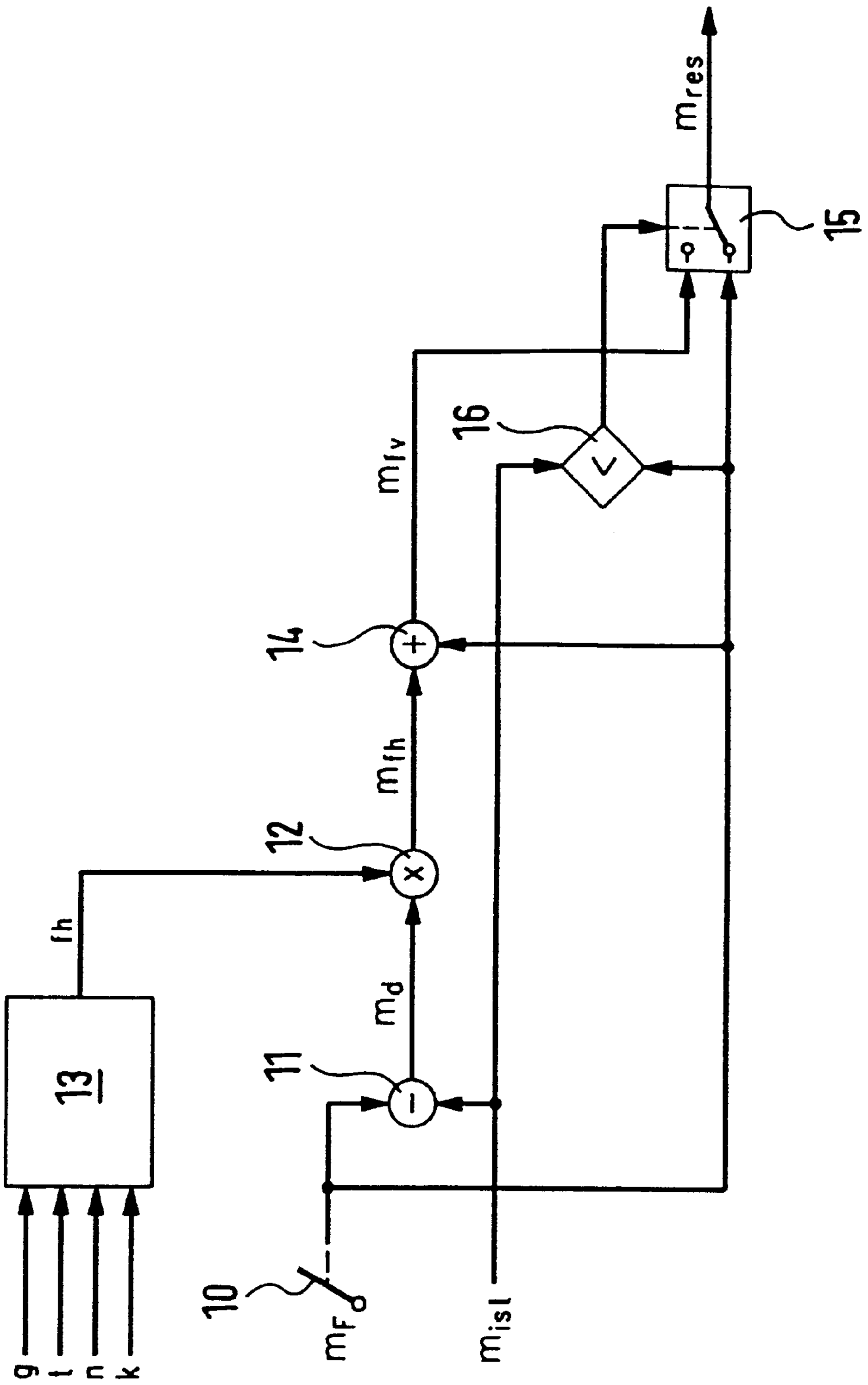
g
t
n
k
13
fh
10
mF
misl
11
md
12
mfh
14
mfv
16
15
mres

METHOD FOR MAGNIFYING TORQUE DURING THE OPERATION OF A MOTOR VEHICLE

FIELD OF THE INVENTION

The present invention relates to a method for setting torque during the operation of a motor vehicle.

BACKGROUND INFORMATION

The torque of an internal combustion engine in a motor vehicle is usually selected by the driver, using the accelerator pedal for the driver-selected torque. In this connection, it has turned out, especially in the case of small accelerator pedal deliveries in the lower to medium load range, that the result is a relatively sluggish reaction, above all in the case of relatively weakly performing, low-volume internal combustion engines. That is explained by the fact that the small accelerator pedal delivery is equivalent to a small engine torque increase. Correspondingly, the throttle moves by only a relatively small angle, whereby the change in engine torque is dynamically set relatively slow, since the cylinder charge is usually throttled dynamically. The responsiveness of a vehicle is customarily set by the characteristics of the accelerator pedal. In this connection, there is the problem that these characteristics have the same effect when parking and leaving a parking space as they do in the case of acceleration processes. In the case of parking and leaving a parking space, fine dosing is required, whereas otherwise a responsive access characteristic is desirable, i.e., the driver expects an immediate engine response to his accelerator change. This conflict of aims between responsiveness and dosability is set in motor vehicles as a compromise in the characteristics of the acceleration pedal.

It is an object of the present invention to provide a method by which an improved responsiveness of the motor vehicle is achieved even in the lower and medium load range at small accelerator pedal deliveries.

SUMMARY

The above and other beneficial objects of the present invention are achieved by providing a method as described herein.

According to the present invention, the driver-selected torque is dynamically magnified in time, so that the actual value of the torque approaches the setpoint value faster; which the driver experiences as improvement in responsiveness. The subsequent reduction in the enhancement component at the approach of the actual value of the torque to the driver-selected torque down to an enhancement component of zero has the effect of a gentle approach to the setpoint value, and prevents an overshooting engine torque.

The reduction of the enhancement component may occur as a function of the difference between the actual value of the torque and the driver-selected torque, so that the enhancement component automatically tends to zero when this difference tends to zero.

The enhancement component may be formed with the aid of a multiplication factor, especially a parameter-dependent multiplication factor. Such parameters are, for example, the current gear step of the transmission and/or the intake temperature and/or the engine speed and/or an ambient correction factor and/or the vehicle type in question. The setpoint selection may then be made with the aid of a characteristics map.

In one example embodiment of the method according to the present invention, the difference value between the actual value of the torque and the driver-selected torque has the multiplication factor applied to it, and the value thus obtained is added to the driver-selected torque for achieving a magnified torque value. It is achieved thereby that the enhancement component is reduced proportionally to the difference value, and thus leads to a gentle feedback to the driver-selected torque or the driver setpoint torque, respectively.

The magnification may be limited to that time interval during which the actual engine torque is less than the driver-selected torque. The torque magnification may be shut off below a specifiable speed, in order to remove, for example, for procedures in connection with parking and leaving parking spaces, the otherwise desired responsive and dynamic response characteristics.

For performing the method, a microcomputer may be provided, which may be, for example, the microcomputer in the central vehicle electronics, which is present anyway.

One example embodiment of the present invention is illustrated in the drawing and explained in detail below.

BRIEF DESCRIPTION OF THE DRAWING

The FIGURE is a schematic circuit-like view of an example embodiment for the explanation of the method according to the present invention.

DETAILED DESCRIPTION

The driver-selected torque $m_F$, specified by the driver via accelerator pedal 10, which represents the setpoint torque specified by the driver, together with the actual torque $m_{ist}$, is added to a difference-forming step 11, by which a difference torque $$m_d = m_F - m_{ist}$$

is formed. The difference torque $m_d$ is taken to a multiplier step 12 and is multiplied by a multiplication factor $f_h$, so that, on the output side, a magnified difference torque $m_{fh}$ is formed. Multiplication factor $f_h$ is formed in a characteristics map step 13 as a function of the respective gear step g, the temperature t of the internal combustion engine, the engine speed n and an ambient correction factor k. Ambient correction factor k is formed, for example, as a function of environmental pressure and the intake air temperature.

These parameters may also be used only partially for the characteristics map-dependent formation of the multiplication factor, or, on the other hand, even further parameters may be considered. For example, setting arrangements for adapting to various vehicle and internal combustion engine types may be provided, by which either multiplication factor $f_h$ is directly influenced or which effect switching between various characteristics maps.

In an adding step 14, the magnified difference torque $m_{fh}$ thus formed is added to the driver-selected torque $m_F$, so that a magnified driver-selected torque $m_{fv}$ is formed. This is passed on to a switch-over step 15, as an alternative definition of a resulting selected torque $m_{res}$, together with driver selected torque $m_F$. The switching of switch-over step 15 is effected by a comparison step 16, in which driver-selected torque $m_F$ is compared to the actual value of the torque $m_{ist}$. Only when the actual value of the torque $m_{ist}$ is less than the driver-selected torque $m_F$ does a switch-over to the magnified driver-selected torque $m_{fv}$ occur, i.e., only under this condition is this selected as the resulting selected torque $m_{res}$ for the formation of the actual engine torque as the setpoint value.

When the driver presses down accelerator pedal 10 in order to raise the engine torque, that is, to speed up the vehicle, driver-selected torque $m_F$ becomes abruptly greater than the actual value of the torque $m_{ist}$, so that switch-over step 15 goes over into the second switching position. The difference torque $m_d$ thus arising is multiplied by the parameter-dependent multiplication factor $f_h$, and difference torque $m_{fh}$ magnified thereby is added to the driver-selected torque for the formation of a magnified driver-selected torque $m_{fv}$. The resulting selected torque $m_{res}$, which is equivalent to magnified driver-selected torque $m_{fv}$, thus abruptly exceeds the driver-selected torque, so that the actual engine torque approaches the actual value of the torque substantially faster than would be the case without the magnification. As a result of this increase of the actual value of the torque $m_{ist}$, difference torque $m_d$ decreases increasingly, and along with that, so does magnified difference torque $m_{fh}$, and along with that, so does magnified driver-selected torque $m_{fv}$ correspondingly or proportionally, as the case may be. If difference torque $m_d$ goes to zero, magnified difference torque $m_{fh}$ also goes to zero, which, in turn, has the result that magnified driver-selected torque $m_{fv}$ is equivalent to driver-selected torque $m_F$. Switch-over step 15 switches over again to the switching state originally indicated. That is, the torque magnification is effective only until the actual engine torque is equivalent to the driver-selected torque.

The individual steps of the switching arrangement illustrated as an example embodiment may be actualized by a microcomputer, and may be present, for example, as additional functions in a microcomputer of central engine electronics that is present in any case, it being, of course, possible to provide a separate microcomputer. In this regard, additional functions may also be actualized. For example, if desired, the effect of the torque magnifications may be suppressed, or rather switched off, when automatic control functions are activated, for instance, a speed control (tempomat), a directional stability control device, a speed limitation, etc.

Furthermore, it is possible to have deactivation, for instance, below a preselected minimum speed, to facilitate parking and leaving a parking space. These measures; for example, may, additionally to comparing step 16, act on switch-over step 15 and during appropriately activated functions, which hold it in the illustrated switching position.

What is claimed is:

1. A method for setting torque during operation of a motor vehicle, comprising the steps of:

magnifying a driver-selected torque dynamically in time; and correspondingly reducing an enhancement component to zero as an actual value of torque approaches the driver-selected torque.

2. The method according to claim 1, wherein the method is performed in accordance with small engine torque changes in a lower to medium load range.

3. The method according to claim 1, wherein the enhancement component is reduced in the reducing step as a function of a difference between the actual value of torque and the driver-selected torque.

4. The method according to claim 3, further comprising the step of forming the enhancement component in accordance with a multiplication factor.

5. The method according to claim 4, wherein the multiplication factor is parameter-dependent.

6. The method according to claim 4, further comprising the step of forming the multiplication factor as a function of at least one of a respective gear step, an intake temperature, an engine speed, an ambient correction factor and a type of vehicle.

7. The method according to claim 6, wherein the multiplication factor is formed in the multiplication factor forming step in accordance with a characteristic map.

8. The method according to claim 4, further comprising the steps of:

applying the multiplication factor to the difference between the actual value of torque and the driver-selected torque; and adding a value obtained in the applying step to the driver-selected torque to achieve a magnified torque value.

9. The method according to claim 1, wherein the magnifying step is limited to a time interval during which the actual value of torque is less than the driver-selected torque.

10. The method according to claim 1, wherein the magnifying step is one of switched off and deactivated below a specifiable speed.

11. The method according to claim 1, wherein the method is performed by a microcomputer.

* * * * *